United States Patent
Du et al.

(10) Patent No.: US 12,061,738 B2
(45) Date of Patent: Aug. 13, 2024

(54) ATTENTION REDIRECTION OF A USER OF A WEARABLE DEVICE

(71) Applicant: GOOGLE LLC, Mountain View, CA (US)

(72) Inventors: Ruofei Du, San Francisco, CA (US); Maksym Dzitsiuk, Oakland, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/326,854

(22) Filed: May 31, 2023

(65) Prior Publication Data
US 2023/0393657 A1   Dec. 7, 2023

Related U.S. Application Data

(60) Provisional application No. 63/365,754, filed on Jun. 2, 2022.

(51) Int. Cl.
| | | |
|---|---|---|
| *G06F 3/01* | (2006.01) | |
| *G06T 7/70* | (2017.01) | |
| *G06V 10/77* | (2022.01) | |
| *G06V 20/50* | (2022.01) | |

(52) U.S. Cl.
CPC .............. *G06F 3/013* (2013.01); *G06T 7/70* (2017.01); *G06V 10/7715* (2022.01); *G06V 20/50* (2022.01)

(58) Field of Classification Search
CPC .... G06V 20/20; G06V 10/7715; G06V 40/18; G06V 20/50; G06T 7/70; G06F 3/013; G06F 3/011
See application file for complete search history.

(56) References Cited

U.S. PATENT DOCUMENTS

| | | | |
|---|---|---|---|
| 9,710,130 B2* | 7/2017 | Mulcahy | G06F 3/013 |
| 10,321,124 B2* | 6/2019 | Kärkkäinen | G06T 15/08 |
| 10,664,991 B2* | 5/2020 | Sugimoto | G06F 3/04842 |
| 10,990,171 B2* | 4/2021 | Sztuk | G06F 3/011 |
| 11,355,023 B2* | 6/2022 | Mei | G09B 5/02 |
| 11,685,384 B2* | 6/2023 | Ratcliff | G06V 40/19 |
| | | | 340/576 |
| 2011/0169625 A1 | 7/2011 | James et al. | |
| 2015/0169047 A1* | 6/2015 | Reponen | G06F 3/005 |
| | | | 345/156 |
| 2019/0371075 A1 | 12/2019 | Stafford et al. | |
| 2020/0232807 A1 | 7/2020 | Müller et al. | |
| 2020/0307616 A1 | 10/2020 | Nithiyanantham et al. | |

(Continued)

OTHER PUBLICATIONS

Valentin, et al., "Depth from Motion for Smartphone AR", ACM Transactions on Graphics, vol. 37, No. 6, Article 193, Nov. 2018, pp. 1-19.

*Primary Examiner* — Vinh T Lam
(74) *Attorney, Agent, or Firm* — Brake Hughes Bellermann LLP (57) ABSTRACT

A method including determining a gaze direction of a user of a wearable device, capturing an image using a forward-looking camera of the wearable device, detecting a surroundings of the user based on the image, determining whether or not the user is distracted based on the gaze direction and the surroundings, and in response to determining the user is distracted, causing an operation to be performed on the wearable device, the operation configured to cause the user to change the user's attention.

20 Claims, 7 Drawing Sheets

(56) References Cited

U.S. PATENT DOCUMENTS

| | | | |
|---|---|---|---|
| 2021/0125521 A1* | 4/2021 | Telpaz | H04N 7/188 |
| 2021/0208403 A1* | 7/2021 | Andersson | G02B 27/0075 |
| 2021/0276568 A1* | 9/2021 | Verbeke | G06F 3/015 |
| 2021/0295073 A1* | 9/2021 | Yu | A61B 5/168 |
| 2022/0187907 A1* | 6/2022 | Lee | G06F 3/04842 |
| 2022/0230015 A1* | 7/2022 | Okamoto | G06F 3/011 |
| 2022/0270501 A1* | 8/2022 | Mei | G09B 5/02 |
| 2022/0291680 A1* | 9/2022 | Schwindt | G08G 5/0039 |
| 2023/0026793 A1* | 1/2023 | Martin | G06F 3/014 |
| 2023/0088712 A1* | 3/2023 | Jenkins | H04N 21/44218 |
| | | | 725/10 |
| 2023/0112174 A1* | 4/2023 | Reynolds | G02B 27/017 |
| | | | 345/156 |
| 2023/0230396 A1* | 7/2023 | Herbert | B60W 50/14 |
| | | | 348/78 |
| 2023/0259199 A1* | 8/2023 | Chang | G06F 3/011 |
| | | | 345/156 |
| 2023/0360431 A1* | 11/2023 | Kuo | G06V 40/168 |

* cited by examiner

ATTENTION REDIRECTION OF A USER OF A WEARABLE DEVICE

CROSS REFERENCE TO RELATED APPLICATION

This application claims the benefit or U.S. Provisional Application No. 63/365,754, filed Jun. 2, 2023, the disclosure of which is incorporated herein by reference in its entirety.

FIELD

Implementations relate to use of a wearable device.

BACKGROUND

Augmented reality (AR)/virtual reality (VR) devices typically include a forward-looking camera configured to capture a real-world view. In some instances, the user of the AR/VR device may be focused away from content captured by forward-looking camera when, under some circumstances, the user should be focused on the content.

SUMMARY

Some implementations can include a mechanism such that the attention of a user of a wearable device can be redirected. The attention can be redirected based on a gaze direction of the user and the surroundings of the user.

In a general aspect, a device, a system, a non-transitory computer-readable medium (having stored thereon computer executable program code which can be executed on a computer system), and/or a method can perform a process with a method including determining a gaze direction of a user of a wearable device, capturing an image using a forward-looking camera of the wearable device, detecting a surroundings of the user based on the image, determining whether or not the user is distracted based on the gaze direction and the surroundings, and in response to determining the user is distracted, causing an operation to be performed on the wearable device, the operation configured to cause the user to change the user's attention.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

It should be noted that these Figures are intended to illustrate the general characteristics of methods, and/or structures utilized in certain example embodiments and to supplement the written description provided below. These drawings are not, however, to scale and may not precisely reflect the precise structural or performance characteristics of any given embodiment and should not be interpreted as defining or limiting the range of values or properties encompassed by example embodiments. For example, the positioning of modules and/or structural elements may be reduced or exaggerated for clarity. The use of similar or identical reference numbers in the various drawings is intended to indicate the presence of a similar or identical element or feature.

DETAILED DESCRIPTION

People are often distracted from objects and/or events that could be inconvenient or even dangerous to the person or other people. For example, a driver of a car could be focused on a car in a road as the driver approaches an intersection that includes a stop sign requiring the driver to stop at the intersection. The inattentiveness of the driver poses a risk of a car accident, a traffic rules violation, missed estimated times of arrival, and/or the like to the driver and/or others on the road.

Example implementation can include a mechanism such that the attention of a user of a wearable devices can be redirected. The wearable device can be, for example, a smart glasses, a head mounted display (HMD), an AR/VR device, mixed reality (e.g., both AR and VR) device, a wearable computing device, and the like. The current attention of the user of the wearable device can be determined (e.g., based on user gaze direction) and the surroundings of the user can be determined (e.g., based on an image captured using a forward-looking camera). If the user is not focused on an object and/or event, an operation can be performed on and/or by the wearable device. The operation can be configured to redirect the attention of the user of the wearable device. For example, an audible notification can be output using a speaker of the wearable device, content (e.g., an image) can be rendered on a display of the wearable device, and/or the like.

Figure 1:
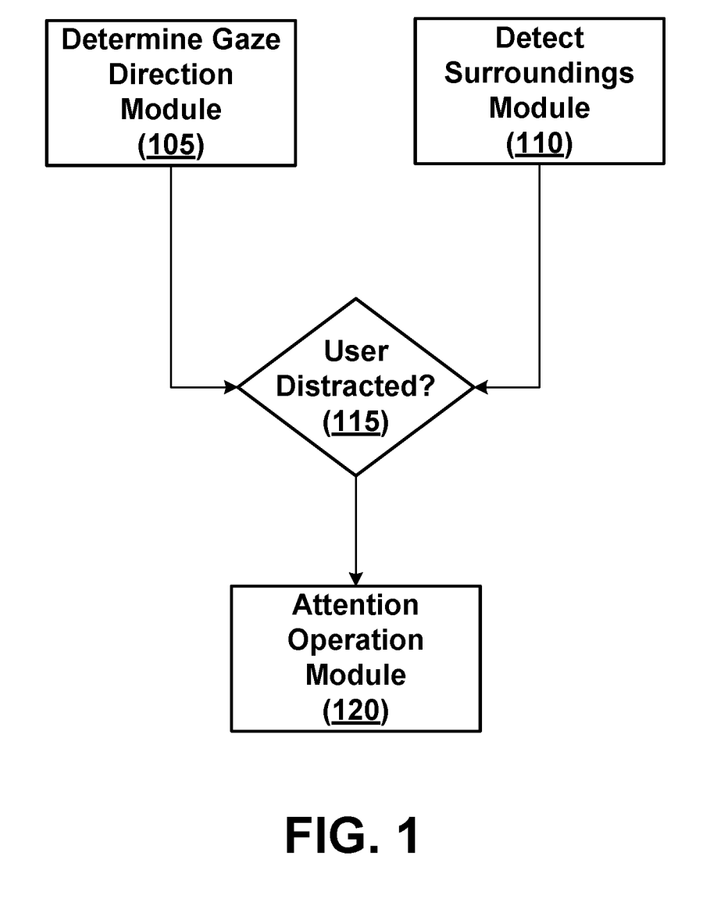
FIG. 1 illustrates a flow diagram for attention redirection according to an example implementation.

FIG. 1 illustrates a flow diagram for attention redirection according to an example implementation. As shown in FIG. 1 the flow diagram includes a determine gaze direction module 105 block, a detect surroundings module 110 block, a user distracted 115 decision block, and an attention operation module 120 block.

The determine gaze direction module 105 can be configured to determine a view or gaze direction of the user of a wearable device. For example, the wearable device can include an eye tracking camera (or other eye tracking sensor) configured to capture an image of the eye and the determine gaze direction module 105 can use the image to determine a gaze direction of the user. The eye tracking camera can capture an image on regular (or somewhat regular) intervals such that the determine gaze direction module 105 can track the gaze direction of the eyes over time.

The detect surroundings module 110 can be configured to detect the surroundings of the user based on an image captured using a forward-looking camera of the wearable device. The surroundings can include a portion of an ambient real-world environment around the user while wearing the HMD. The surroundings can include a portion of an ambient real-world environment the user while wearing the HMD is going into (e.g., the environment in front of). For example, the surroundings can include where the user (e.g., while walking, running, riding, driving, and the like) is destined (e.g., headed, directed, going to, and the like). An image captured by a forward-looking camera can capture the portion of the real-world environment. The image can include an object and/or an event. Therefore, the surroundings can include an object and/or event. In some implementations, the surroundings can include an object and/or event that should have the user's attention. For example, the surroundings could include a traffic (e.g., stop) sign, a pedestrian in a crosswalk, a police car, an accident and/or the like in the surroundings.

The detect surroundings module 110 can be configured to use a machine learned model to identify feature(s) of the image captured by the forward-looking camera. The features including, for example, the object(s) and/or event(s). The detect surroundings module 110 can be configured to detect the surroundings based on other input. For example, the detect surroundings module 110 can be configured to detect the surroundings based on a datastore including, for example, traffic sign locations, police car location, accident location, stranded car location, and/or the like.

The user distracted 115 can be configured to determine whether or not the user of the wearable device is paying attention to an object and/or event that should have the user's attention. For example, the user distracted 115 can be configured to determine if one or more of the object(s) and/or event(s) should have the user's attention. The user distracted 115 can be configured to determine if the user is looking at, gazing at, viewing, and/or looking/gazing/viewing in the direction of object and/or event that should have the user's attention. For example, as discussed above, the eye tracking camera can capture an image on regular (or somewhat regular) intervals such that the determine gaze direction module 105 can track the gaze direction of the eyes over time. The gaze direction can be used to determine whether or not the user is distracted. In some implementations, if the gaze direction is determined to be not directed toward the object and/or event that should have the user's attention, the user can be determined to be distracted. In response to determining the user is looking at or on the direction of the object and/or event that should have the user's attention, the user can be determined as not being distracted. In response to determining the user is not looking at or on the direction of the object and/or event that should have the user's attention, the user can be determined as being distracted. In some implementations, the can be determined as being distracted if the gaze direction is not in the direction of the object and/or the event for a threshold period of time.

The attention operation module 120 can be configured to perform an operation on the wearable device. The operation can be configured to cause the user of the wearable device to change the user's attention or focus away from where the user's attention or focus currently is. For example, the attention operation module 120 can use a speaker of the wearable device to generate an audible signal to change the user's attention or focus. For example, the attention operation module 120 can use a display of the wearable device to render content to change the user's attention or focus.

Figure 2:
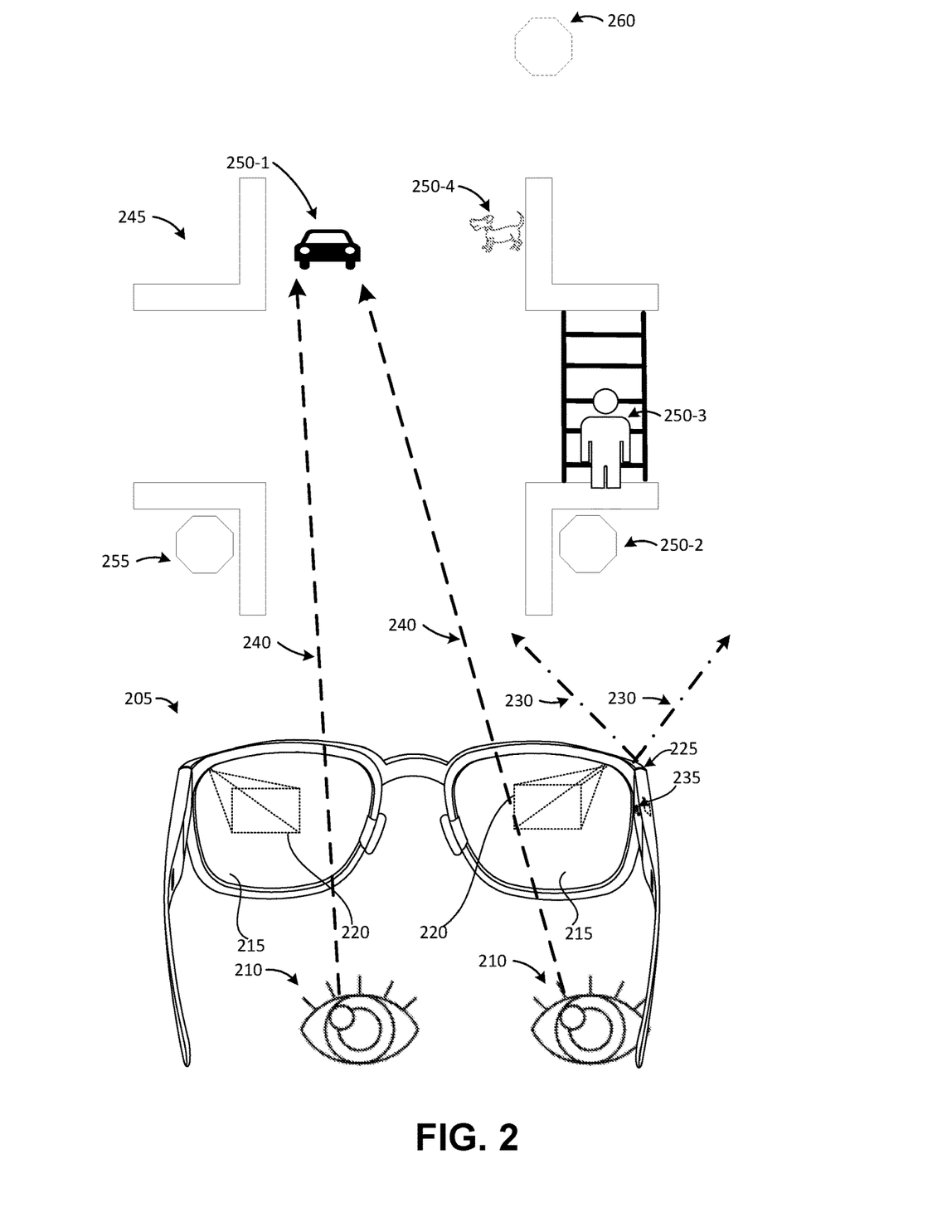
FIG. 2 illustrates a pictorial diagram of a user attention while wearing a wearable device according to an example implementation.

FIG. 2 illustrates a pictorial diagram of a user attention while wearing a wearable device according to an example implementation. The diagram illustrates a possible use case of a driver of a car. The diagram includes a wearable device 205, eyes 210 of a user of the wearable device 205, and an intersection 245. The wearable device 205 includes lens 215, overlay display 220, forward-looking camera 225, and an eye-tracking camera 235. The wearable device 205 can be communicatively coupled to a companion computing device, and at least a portion of processing can be performed on the companion computing device.

Lines 240 indicate a gaze direction of the eyes 210 of the user of the wearable device 205. The gaze direction of the eyes 210 of the user of the wearable device 205 can be determined using the eye-tracking camera 235. As shown in FIG. 2, the lines 240 indicate eyes 210 are looking at an object 250-1 (illustrated as a car) in the intersection 245.

Lines 230 indicate a real-world gaze direction of the forward-looking camera 225. The gaze direction of the forward-looking camera 225 can indicate content that can be in an image captured by the forward-looking camera 225. For example, the image could include the intersection 245 and object 250-1, 250-2, 250-3, 250-4. In an example implementation, object 250-2, object 250-3, and object 250-4 may be an object and/or event (e.g., object 250-3 and object 250-4 could be crossing a street) that should have the user's attention. However, the gaze direction of the eyes 210 of the user of the wearable device 205 (as indicated by lines 240) can indicate that the user of the wearable device 205 may not be paying attention to object 250-2, object 250-3, and/or object 250-4. For example, the gaze direction can be away from (e.g., not in the direction of, not focused on, and/or the like) the object and the user can be distracted if the gaze direction is away from the object. For example, the gaze direction can be away from (e.g., not in the direction of, not focused on, and/or the like) the event and the user can be distracted if the gaze direction is away from the object.

In an example implementation, object 250-2 can be a traffic sign (e.g., a stop sign). Accordingly, the user may violate a traffic rule or become involved in a car accident by not paying attention to object 250-2 as a traffic sign (e.g., a stop sign). For example, the user of the wearable device 205 may not stop at intersection 245 as required by a stop sign leading to a traffic rule violation or car accident. In an example implementation, object 250-3 can be a person in a crosswalk and object 250-4 can be an animal (e.g., a dog) crossing (or about to cross) a street. The gaze direction of the eyes 210 of the user of the wearable device 205 (as indicated by lines 240) can indicate that the user of the wearable device 205 may not be paying attention to object 250-3 and object 250-4. Accordingly, the user of the wearable device 205 could drive a car into object 250-3 and/or object 250-4 because the user of the wearable device 205 may not be paying attention to an object and/or event (e.g., object 250-3 and object 250-4 could be crossing a street) that should have the user's attention.

In an example implementation, the wearable device 205 can be configured to cause the user of the wearable device 205 to change the user's attention or focus away from where the user's attention or focus currently is. For example, the wearable device 205 can be configured to cause the user of the wearable device 205 to change the user's attention or focus away from the object 250-1. For example, the wearable device 205 can use a speaker of the wearable device to generate an audible signal to change the user's attention or focus. For example, the overlay display 220 of the wearable device 205 can be used to render an indicator (e.g., a flashing stop sign) to change the user's attention or focus.

In an example implementation, an object 255 can be included in an image captured by the forward-looking camera 225. However, the object 255 (e.g., a stop sign) may not be an object and/or event that should have the user's attention. Alternatively, object 255 (e.g., a stop sign) may be determined as being within the view or gaze of the user of the wearable device 205. Therefore, object 255 may not initiate an operation that may cause the user of the wearable device 205 to change the user's attention or focus away from where the user's attention or focus currently is.

In an example implementation, an object 260 (e.g., a traffic sign) can be an object and/or event that should have the user's attention in the future (e.g., a short period from the current time), but may not be in an image captured by the forward-looking camera 225. For example, surroundings information can be read from a datastore. The surroundings information can indicate an object and/or event that should have the user's attention at a future time. The wearable device 205 can be configured to generate an indication of the object and/or event that should have the user's attention at a future time. For example, object 260 may be in a datastore including, for example, traffic sign locations, police car location, accident location, stranded car location, and/or the like. Therefore, in an example implementation, object 260 may not initiate an operation that may cause the user of the wearable device 205 to change the user's attention or focus away from where the user's attention or focus. In this implementation, the operation can be different than the operation initiated in response to determining that the user of the wearable device 205 may not be paying attention to object 250-2, object 250-3, and object 250-4. For example, object 260 may cause a slowly flashing or transparent indicator (e.g., stop sign) to be rendered on the overlay display 220 of the wearable device 205. Whereas object 250-2, object 250-3, and/or object 250-4 may cause a quickly flashing or solid indicator (e.g., stop sign) to be rendered on the overlay display 220 of the wearable device 205.

Figure 3:
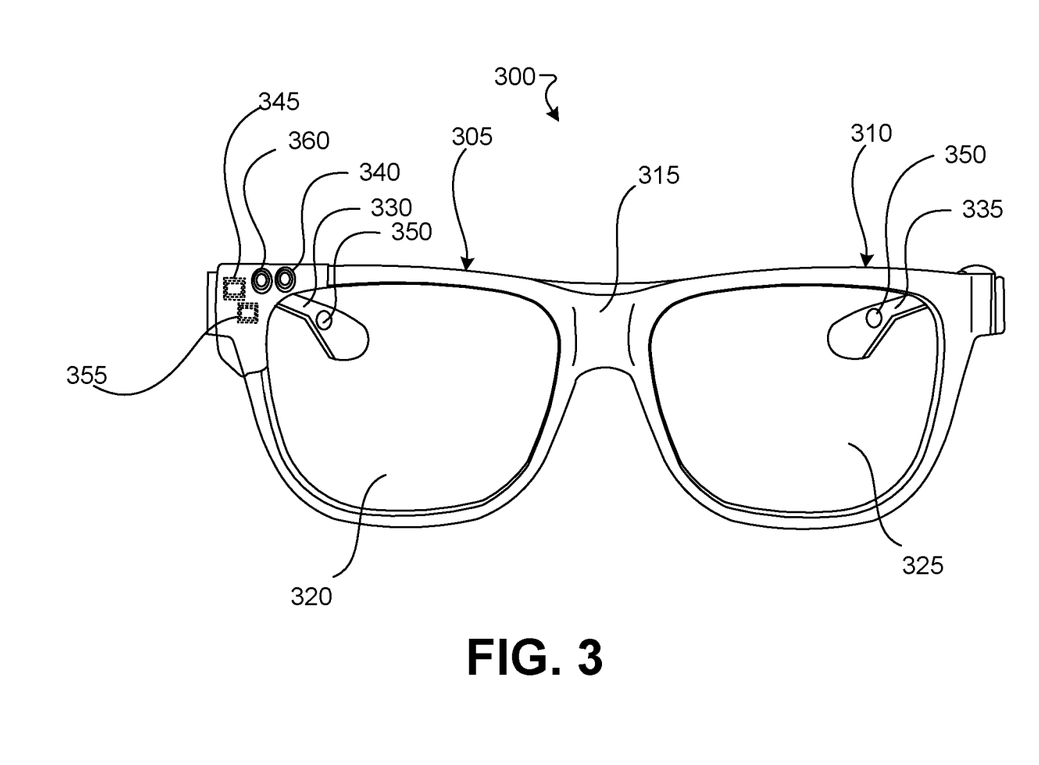
FIG. 3 illustrates a wearable device according to an example implementation.

FIG. 3 illustrates a wearable device according to an example implementation. As shown in FIG. 3, a wearable device 300 includes lens frame 305, lens frame 310, center frame support 315, lens element 320, lens element 325, extending side-arm 330, extending side-arm 335, image capture device 340 (e.g., a forward-looking camera), on-board computing system 345, speaker 350, microphone 355, and sensor device 360 (e.g., an eye-tracking camera). The wearable device 300 can be communicatively coupled to a companion computing device, and at least a portion of processing can be performed on the companion computing device.

Each of the frame elements 305, 310, and 315 and the extending side-arms 330, 335 can be formed of a solid structure of plastic and/or metal or can be formed of a hollow structure of similar material so as to allow wiring and component interconnects to be internally routed through the wearable device 300. Other materials can be used as well. At least one of the lens elements 320, 325 can be formed of any material that can suitably display a projected image or graphic. Each of the lens elements 320, 325 can also be sufficiently transparent to allow a user to see through the lens element. Combining these two features of the lens elements can facilitate an augmented reality or heads-up display where the projected image or graphic is superimposed over a real-world view as perceived by the user through the lens elements.

The center frame support 315 and the extending side-arms 330, 335 can be configured to secure the wearable device 300 to a user's face via a user's nose and ears, respectively. The extending side-arms 330, 335 can each be projections that extend away from the lens-frames 305, 310, respectively, and can be positioned behind a user's ears to secure the wearable device 300 to the user. The extending side-arms 330, 335 can further secure the wearable device 300 to the user by extending around a rear portion of the user's head. Additionally, or alternatively, for example, the wearable device 300 can connect to or be affixed within a head-mounted helmet structure. Other configurations for a wearable computing device are also possible.

The on-board computing system 345 is shown to be positioned on the frame element 305. However, alternatively, or additionally, in some implementation, the on-board computing system 345 can be positioned on the extending side-arm 330, 335 of the wearable device 300 and/or can be provided on other parts of the wearable device 300 and/or can be remotely positioned from the wearable device 300 (e.g., the on-board computing system 345 could be wire- or wirelessly-connected to the wearable device 300). The on-board computing system 345 can include a processor and memory, for example. The on-board computing system 345 can be configured to receive and analyze data from the image capture device 340 (and possibly from other sensory devices) and generate images for output by the lens elements 320, 325.

The image capture device 340 can be, for example, a camera that is configured to capture still images and/or to capture video. In the illustrated configuration, image capture device 340 is positioned on the extending side-arm 330 of the wearable device 300; however, the image capture device 340 can be provided on other parts of the wearable device 300. The image capture device 340 can be configured to capture images at various resolutions or at different frame rates. Many image capture devices with a small form-factor, such as the cameras used in mobile phones or webcams, for example, can be incorporated into an example of the wearable device 300.

One image capture device 340 is illustrated. However, more image capture devices can be used, and each can be configured to capture the same view, or to capture different views. For example, the image capture device 340 can be forward facing to capture at least a portion of the real-world view perceived by the user. This forward-facing image captured by the image capture device 340 can then be used to generate an augmented reality where computer generated images appear to interact with or overlay the real-world view perceived by the user. The forward-facing image captured by the image capture device 340 can be used to generate an image used to determine whether or not the user is distracted.

The sensor device 360 can be, for example, a camera that is configured to capture still images and/or to capture video. In the illustrated configuration, sensor device 360 is positioned on an inner portion of a lens frame of the wearable device 300; however, the sensor device 360 can be provided on other parts (e.g., facing the user) of the wearable device 300. The sensor device 360 can be configured to capture images at various resolutions or at different frame rates. Many image capture devices or other types of sensors that can be configured to track an eye gaze direction with a small form-factor can be incorporated into an example of the wearable device 300. One sensor device 360 is illustrated. However, more sensor devices can be used, and each can be configured to capture the same view, or to capture different views related to an eye gaze direction. The sensor device 360 can be used to generate an image used to determine whether or not the user is distracted.

Figure 4:
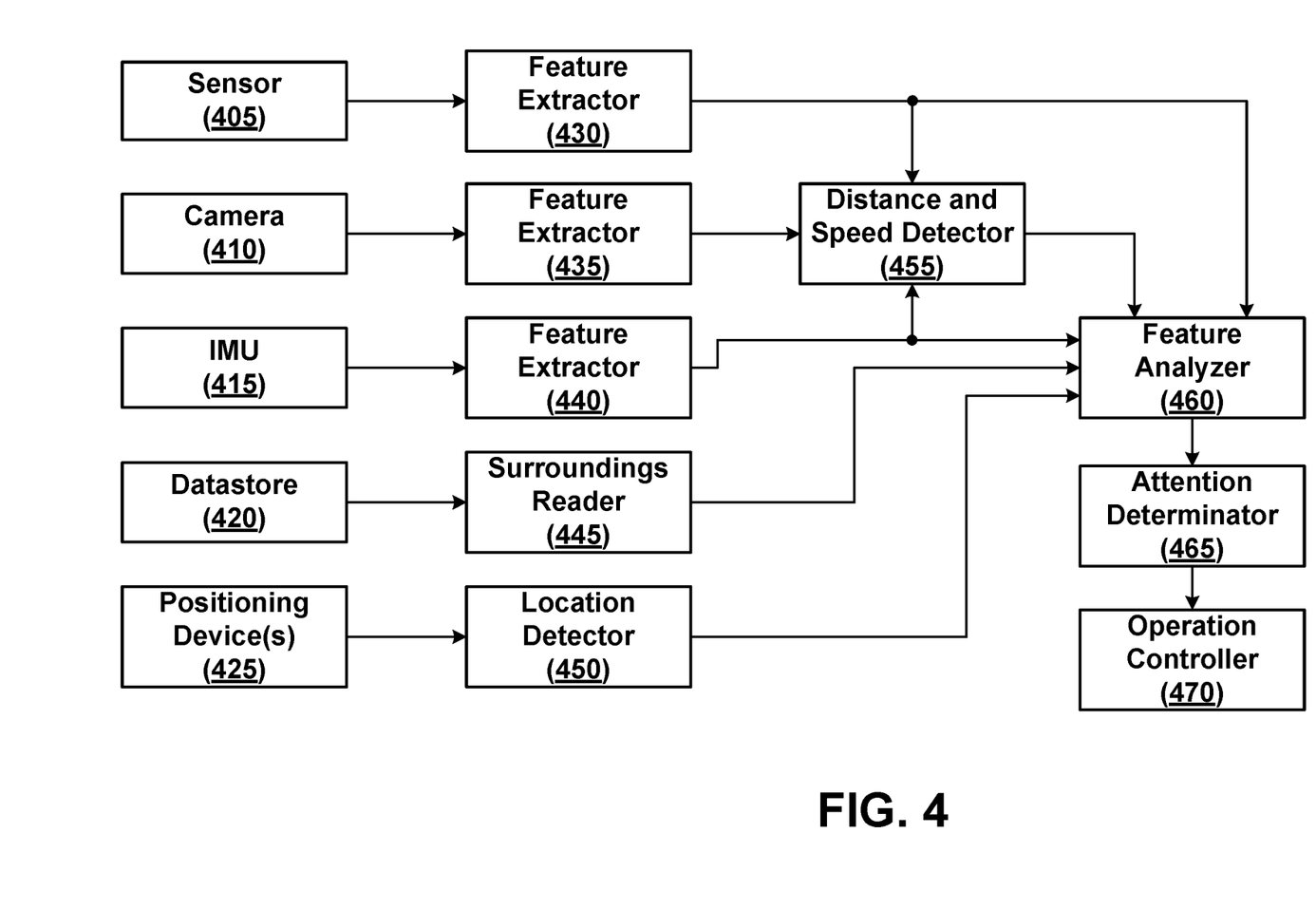
FIG. 4 illustrates a block diagram of a signal flow for attention redirection according to an example implementation.

FIG. 4 illustrates a block diagram of a signal flow for attention redirection according to an example implementation. As shown in FIG. 4, the signal flow includes a sensor 405, a camera 410, an inertial measurement unit (IMU) 415, a datastore 420, a positioning device(s) 425, a feature extractor 430, 435, 440, a surroundings reader 445, a location detector 450, a distance and speed detector 455, a feature analyzer 460, an attention determinator 465, and an operation controller 470.

The sensor 405 can be configured to track an eye gaze direction of a user of a wearable device (e.g., wearable device 205, 300). The sensor 405 can be, for example, a camera that is configured to capture still images and/or to capture video. The sensor 405 can be, for example, a camera that is inward facing (e.g., directed toward the wearer or user of the wearable device, facing an eye(s) of the wearer or user of the wearable device, facing the face of the wearer or user device and/or the like). The sensor 405 can be configured to capture images at various resolutions or at different frame rates.

The feature extractor 430 can be configured to extract features from an image captured by the sensor 405. The feature extractor 430 can be a machine learned model trained to extract features associated with, for example, the eyes of a user of a wearable device (e.g., wearable device 205, 300). The machine learned model can be a neural network. The features can be used to determine (or help determine) an eye gaze direction of the user of the wearable device. The feature extractor 430 can be a deterministic algorithm or model that can generate features corresponding to an eye gaze direction of the user of the wearable device. The sensor 405 can be any image capture devices or other type of sensor that can be configured to track an eye gaze direction of the user of the wearable device with a small form-factor.

The camera 410 can be configured to capture still images and/or to capture video. The feature extractor 435 can be configured to extract features from an image captured by the camera 410. The camera 410 can be a forward-looking camera of a wearable device (e.g., wearable device 205, 300). Therefore, the camera 410 can be configured to capture an image representing a real-world view as seen by the user of the wearable device (e.g., wearable device 205, 300). The image captured by the camera 410 can include an object and/or event (e.g., a person crossing a street, a car accident, and/or the like) that may be within the real-world view seen by the user of the wearable device. The image captured by the camera 410 can include and/or be used to generate depth data. The depth data can include a depth of the object and/or event.

The feature extractor 435 can be configured to extract features representing the object and/or event in the image captured by the camera 410. The feature extractor 435 can be configured to extract features representing a depth of the object and/or event in the image captured by the camera 410. The feature extractor 435 can be a machine learned model trained to extract features associated with, for example, the surroundings (e.g., objects, events, and/or the like) in an image representing a real-world view as seen by the user of the wearable device. The machine learned model can be a neural network. The features can be used to identify (or help identify) objects, events, and/or the like that may be seen by the user of the wearable device. The feature extractor 435 can be a deterministic algorithm or model that can generate features corresponding to objects, events, and/or the like that may be seen by the user of the wearable device.

The IMU 415 can be configured to measure and report velocity, orientation, and gravitational forces, using a combination of sensors (accelerometers, gyroscopes and magnetometers). For example, the IMU 415 can report pitch, yaw, and roll associated with the wearable device, an orientation of the wearable device, a change in orientation of the wearable device, an acceleration of the wearable device, and/or the like. For example, the IMU 415 can be used for three (3) degrees of freedom (3 DoF) movement measurements of the wearable device. The IMU 415 can be configured to generate velocity and acceleration of the wearable device. The velocity and acceleration of the wearable device can be used for determining (or helping to determine), for example, changes in eye gaze direction of a user of a wearable device. The feature extractor 440 can be configured to extract features representing, for example, the velocity and acceleration of the wearable device. The feature extractor 4440 can be a machine learned model trained to extract features associated with, for example, the velocity and acceleration of the wearable device. The machine learned model can be a neural network. The features can be used to identify (or help identify) changes in what may be seen by the user of the wearable device. The feature extractor 440 can be a deterministic algorithm or model that can generate features corresponding to changes in what may be seen by the user of the wearable device.

The datastore 420 can be configured to store information related to, for example, traffic sign type and location, speed trap location, accident location, broken down vehicle location, traffic data, and/or the like. The surroundings reader 445 can be configured to read information from the datastore 420. The read information can be associated with the location of the wearable device (e.g., wearable device 205, 300). For example, a traffic sign type and location can be read from the datastore 420 based on the location of the wearable device.

The positioning device(s) 425 can include, for example, GPS, Bluetooth, WIFI, and/or other mobile device positioning devices. The positioning device(s) 425 can be included in the wearable device (e.g., wearable device 205, 300), in a companion device and/or accessible by the wearable device and/or the companion device. The location detector 450 can be configured to determine the location of the wearable device (e.g., wearable device 205, 300) based on data received from the positioning device(s) 425. For example, the location detector 450 can be configured to determine the location of the wearable device (e.g., longitude and latitude) based on GPS data.

The distance and speed detector 455 can be configured to determine a distance to an object (e.g., traffic signs, speed trap, accident, and/or the like) and/or event and the speed of the wearable device (e.g., the speed of the car the user of the wearable device is in). The distance and speed detector 455 can be configured to indicate an amount of time until encountering the object and/or event.

The feature analyzer 460 can be configured to collectively analyze data including features, distance, speed, read data, location and/or the like. The feature analyzer 460 can be a machine learned model trained to analyze multi-modal features and their probabilities. For example, the machine learned model can be trained to predict the probability that a stop sign, an accident, speed trap and/or the like is within the surroundings of the wearable device. For example, the machine learned model can be trained to predict the probability that user of the wearable device is paying attention to the feature.

The attention determinator 465 can be configured to determine whether or not the user of the wearable device is paying attention to an object and/or event (e.g., a stop sign) based on the results from the feature analyzer 460. For example, the attention determinator 465 can be configured to determine whether or not the user of the wearable device is likely (e.g., a probability above a threshold value) paying attention to an object and/or event with a threshold probability of existing and being an object and/or event that the user of the wearable device should be paying attention to. For example, the determining of whether or not the user is distracted can include using a machine learned model trained to analyze features and their probabilities, the features being associated with the gaze direction and the surroundings. A probability that the user is distracted can be determined based on the features and their probabilities. The user can be determined to be distracted if the probability that the user is distracted is above a threshold.

The operation controller 470 can be configured to perform an operation on the wearable device. The operation can be configured to cause the user of the wearable device to change the user's attention or focus away from where the user's attention or focus currently is. For example, the operation controller 470 can cause a speaker (e.g., speaker 350) of the wearable device to generate an audible signal to change the user's attention or focus. For example, the operation controller 470 can cause a display (e.g., overlay display 220) of the wearable device to render content to change the user's attention or focus.

Figure 5:
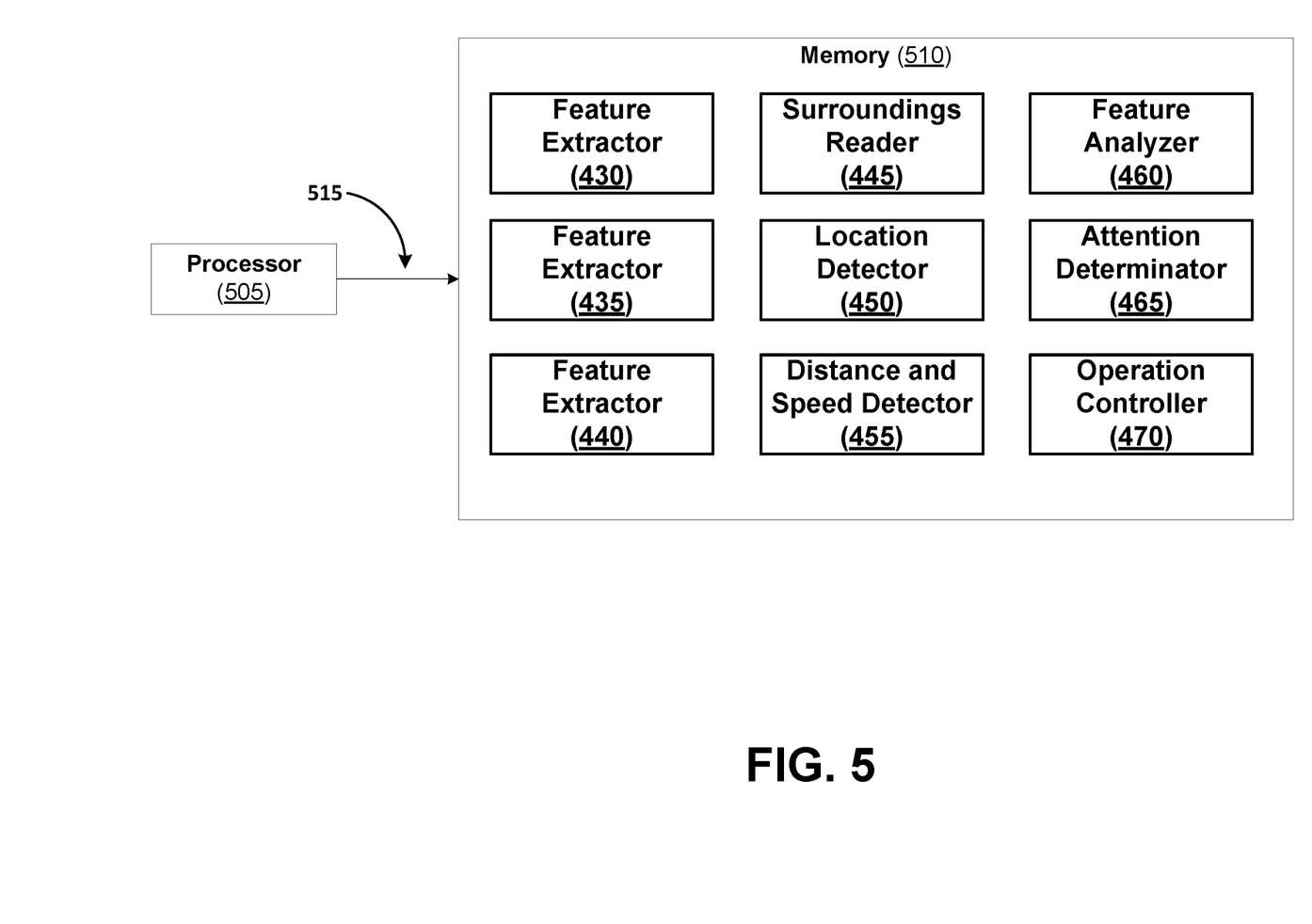
FIG. 5 illustrates a block diagram of a system according to an example implementation.

FIG. 5 illustrates a block diagram of a system according to an example implementation. In the example of FIG. 5, the system (e.g., an augmented reality system) can include a computing system or at least one computing device and should be understood to represent virtually any computing device configured to perform the techniques described herein. As such, the device may be understood to include various components which may be utilized to implement the techniques described herein, or different or future versions thereof. By way of example, the system can include a processor 505 and a memory 510 (e.g., a non-transitory computer readable memory). The processor 505 and the memory 510 can be coupled (e.g., communicatively coupled) by a bus 515.

The processor 505 may be utilized to execute instructions stored on the at least one memory 510. Therefore, the processor 505 can implement the various features and functions described herein, or additional or alternative features and functions. The processor 505 and the at least one memory 510 may be utilized for various other purposes. For example, the at least one memory 510 may represent an example of various types of memory and related hardware and software which may be used to implement any one of the modules described herein.

The at least one memory 510 may be configured to store data and/or information associated with the device. The at least one memory 510 may be a shared resource. Therefore, the at least one memory 510 may be configured to store data and/or information associated with other elements (e.g., image/video processing or wired/wireless communication) within the larger system. Together, the processor 505 and the at least one memory 510 may be utilized to implement the techniques described herein. As such, the techniques described herein can be implemented as code segments (e.g., software) stored on the memory 510 and executed by the processor 505. Accordingly, the memory 510 can include the feature extractor 430, 435, 440, the surroundings reader 445, the location detector 450, the distance and speed detector 455, the feature analyzer, 460, the attention determinator 465, and the operation controller 470.

None, one, or more of the elements described with regard to FIG. 5 can be implemented using a split computing system. For example, a companion device including a processor and memory can be communicatively coupled with the wearable device 205, 300. Accordingly, one or more of the feature extractor 430, 435, 440, the surroundings reader 445, the location detector 450, the distance and speed detector 455, the feature analyzer, 460, the attention determinator 465, and the operation controller 470 can be implemented in the companion device and the result of the execution of the feature extractor 430, 435, 440, the surroundings reader 445, the location detector 450, the distance and speed detector 455, the feature analyzer, 460, the attention determinator 465, and the operation controller 470 can be communicated to the wearable device 205 300.

Example implementations can include a non-transitory computer-readable storage medium comprising instructions stored thereon that, when executed by at least one processor, are configured to cause a computing system to perform any of the methods described above. Example implementations can include an apparatus including means for performing any of the methods described above. Example implementations can include an apparatus including at least one processor and at least one memory including computer program code, the at least one memory and the computer program code configured to, with the at least one processor, cause the apparatus at least to perform any of the methods described above.

Figure 6:
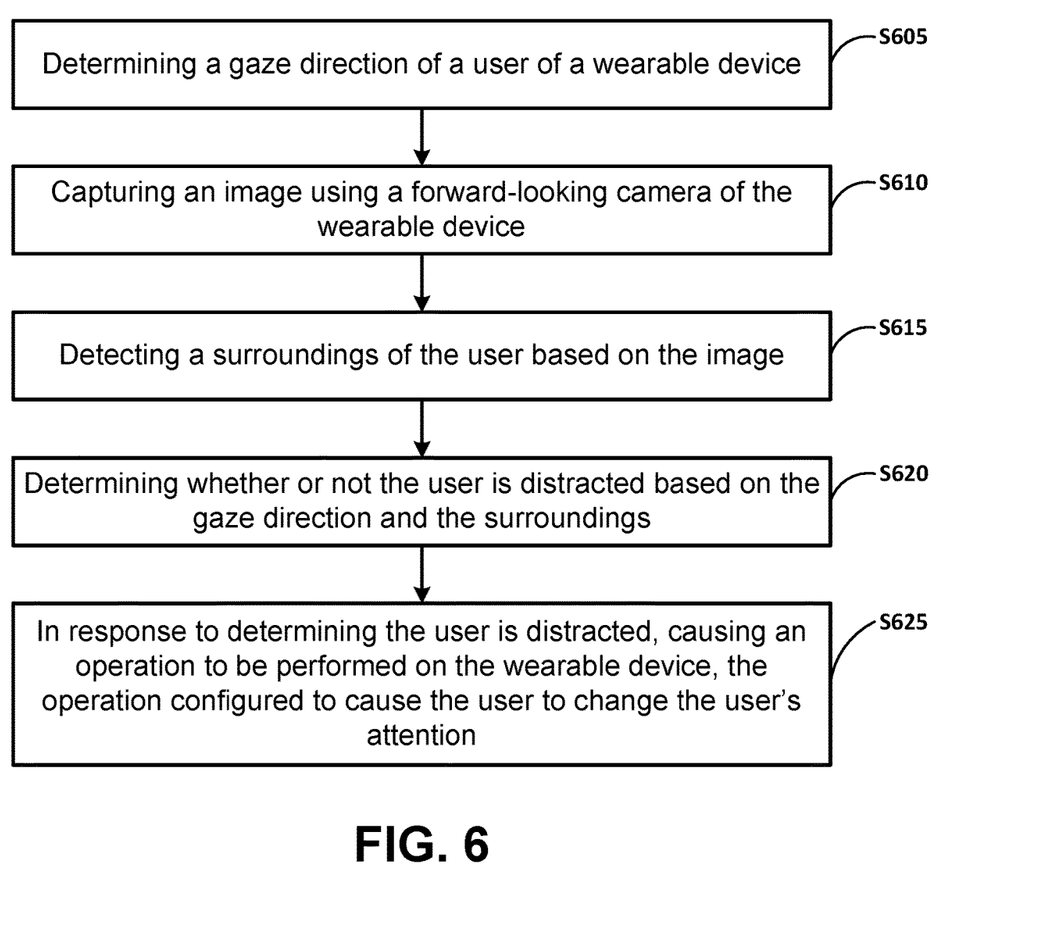
FIG. 6 is a block diagram of a method of operating a wearable device according to an example implementation.

Example 1. FIG. 6 is a block diagram of a method of operating a wearable device according to an example implementation. As shown in FIG. 6, in step S605 determining a gaze direction of a user of a wearable device. In step S610 capturing an image using a forward-looking camera of the wearable device. In step S615 detecting a surroundings of the user based on the image. In step S620 determining whether or not the user is distracted based on the gaze direction and the surroundings. In step S625 in response to determining the user is distracted, causing an operation to be performed on the wearable device, the operation configured to cause the user to change the user's attention.

Example 2. The method of Example 1, wherein the image can include an object, the surroundings of the user can be based on the object, and the user can be distracted if the gaze direction is away from the object.

Example 3. The method of Example 1, wherein the image can include an event, the surroundings of the user can be based on the event, and the user can be distracted if the gaze direction is away from the event.

Example 4. The method of Example 1, wherein the wearable device can include a speaker and the wearable device can be configured to generate an audible signal on the speaker to change the user's attention.

Example 5. The method of Example 1, wherein the wearable device can include an overlay display and the wearable device can be configured to generate an indicator on the overlay display to change the user's attention.

Example 6. The method of Example 1 can further include reading surroundings information from a datastore, the surroundings information can indicate at least one of an object or event that should have the user's attention at a future time and the operation can be configured to generate an indication of the at least one of object or event that should have the user's attention at a future time.

Example 7. The method of Example 1, wherein the determining of whether or not the user is distracted can include using a machine learned model trained to analyze features and their probabilities, the features being associated with the gaze direction and the surroundings, determining a probability that the user is distracted based on the features and their probabilities, and the user can be determined to be distracted if the probability that the user is distracted is above a threshold.

Example 8. A method can include any combination of one or more of Example 1 to Example 7.

Example 9. A non-transitory computer-readable storage medium comprising instructions stored thereon that, when executed by at least one processor, are configured to cause a computing system to perform the method of any of Examples 1-8.

Example 10. An apparatus comprising means for performing the method of any of Examples 1-8.

Example 11. An apparatus comprising at least one processor and at least one memory including computer program code, the at least one memory and the computer program code configured to, with the at least one processor, cause the apparatus at least to perform the method of any of Examples 1-8.

Figure 7:
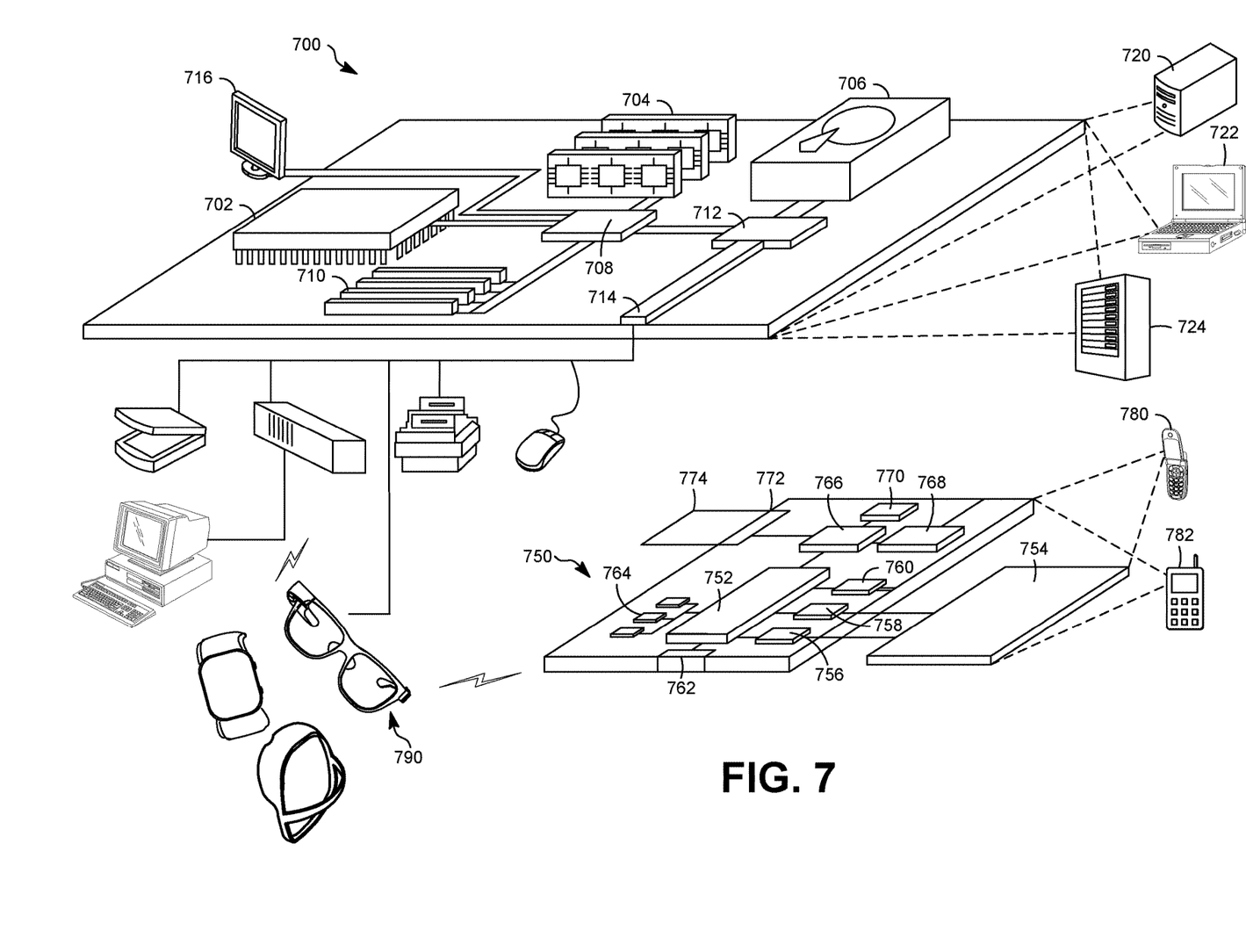
FIG. 7 shows an example of a computer device and a mobile computer device according to at least one example embodiment.

FIG. 7 illustrates an example of a computer device 700 and a mobile computer device 750, which may be used with the techniques described herein. The computing device 700 includes a processor 702, memory 704, a storage device 706, a high-speed interface 708 connecting to memory 704 and high-speed expansion ports 710, and a low-speed interface 712 connecting to low-speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high-speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in a information carrier. The computer program product may also contain instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low-speed controller 712 manages lower bandwidth-intensive operations. Such allocation of functions is example only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display), and LED (Light Emitting Diode) or an OLED (Organic Light Emitting Diode) display, or other appropriate display technology. The display interface 756 may include appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In-Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in the figure can include sensors that interface with an AR headset/HMD device 790 to generate an augmented environment for viewing inserted content within the physical space. For example, one or more sensors included on a computing device 750 or other computing device depicted in the figure, can provide input to the AR headset 790 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 750 can use the sensors to determine an absolute position and/or a detected rotation of the computing device in the AR space that can then be used as input to the AR space. For example, the computing device 750 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer. In some implementations, the user can aim at a target location using a virtual laser pointer.

In some implementations, one or more input devices included on, or connect to, the computing device 750 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 750 when the computing device is incorporated into the AR space can cause a particular action to occur in the AR space.

In some implementations, a touchscreen of the computing device 750 can be rendered as a touchpad in AR space. A user can interact with the touchscreen of the computing device 750. The interactions are rendered, in AR headset 790 for example, as movements on the rendered touchpad in the AR space. The rendered movements can control virtual objects in the AR space.

In some implementations, one or more output devices included on the computing device 750 can provide output and/or feedback to a user of the AR headset 790 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 750 may appear as another object in a computer-generated, 3D environment. Interactions by the user with the computing device 750 (e.g., rotating, shaking, touching a touchscreen, swiping a finger across a touch screen) can be interpreted as interactions with the object in the AR space. In the example of the laser pointer in an AR space, the computing device 750 appears as a virtual laser pointer in the computer-generated, 3D environment. As the user manipulates the computing device 750, the user in the AR space sees movement of the laser pointer. The user receives feedback from interactions with the computing device 750 in the AR environment on the computing device 750 or on the AR headset 790. The user's interactions with the computing device may be translated to interactions with a user interface generated in the AR environment for a controllable device.

In some implementations, a computing device 750 may include a touchscreen. For example, a user can interact with the touchscreen to interact with a user interface for a controllable device. For example, the touchscreen may include user interface elements such as sliders that can control properties of the controllable device.

Computing device 700 is intended to represent various forms of digital computers and devices, including, but not limited to laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be examples only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or implementations herein disclosed irrespective of whether or not that particular combination has been specifically enumerated in the accompanying claims at this time.

What is claimed is:

1. A method comprising:
   determining a gaze direction of a user of a wearable device;
   capturing an image using a forward-looking camera of the wearable device;
   detecting a surroundings of the user based on the image;
   determining whether or not the user is distracted based on the gaze direction and the surroundings; and
   in response to determining the user is distracted, causing an operation to be performed on the wearable device, the operation configured to cause the user to change an attention of the user.

2. The method of claim 1, wherein
   the image includes an object,
   the surroundings of the user is based on the object, and
   the user is distracted if the gaze direction is away from the object.

3. The method of claim 1, wherein
   the image includes an event,
   the surroundings of the user is based on the event, and
   the user is distracted if the gaze direction is away from the event.

4. The method of claim 1, wherein
   the wearable device includes a speaker, and
   the wearable device generates an audible signal on the speaker to change the attention of the user.

5. The method of claim 1, wherein
   the wearable device includes an overlay display, and
   the wearable device generates an indicator on the overlay display to change the attention of the user.

6. The method of claim 1, further comprising:
   reading surroundings information from a datastore, the surroundings information indicating at least one of an object or event that should have the attention of the user at a future time, and
   the operation configured to generate an indication of the at least one of object or event that should have the attention of the user at a future time.

7. The method of claim 1, wherein the determining of whether or not the user is distracted includes:
   using a machine learned model trained to analyze features and their probabilities, the features being associated with the gaze direction and the surroundings,
   determining a probability that the user is distracted based on the features and their probabilities, and
   the user is determined to be distracted if the probability that the user is distracted is above a threshold.

8. A non-transitory computer-readable storage medium comprising instructions stored thereon that, when executed by at least one processor, are configured to cause a computing system to:
   determine a gaze direction of a user of a wearable device;
   capture an image using a forward-looking camera of the wearable device;
   detect a surroundings of the user based on the image;
   determine whether or not the user is distracted based on the gaze direction and the surroundings; and
   in response to determining the user is distracted, cause an operation to be performed on the wearable device, the operation configured to cause the user to change to change an attention of the user.

9. The non-transitory computer-readable storage medium of claim 8, wherein
   the image includes at least one of an object or an event,
   the surroundings of the user is based on the at least one of object or event, and
   the user is distracted if the gaze direction is away from the at least one of object or event.

10. The non-transitory computer-readable storage medium of claim 8, wherein
    the wearable device includes a speaker, and
    the wearable device generates an audible signal on the speaker to change the attention of the user.

11. The non-transitory computer-readable storage medium of claim 8, wherein
    the wearable device includes an overlay display, and
    the wearable device generates an indicator on the overlay display to change the attention of the user.

12. The non-transitory computer-readable storage medium of claim 8, wherein the instructions further comprise:
    reading surroundings information from a datastore, the surroundings information indicating at least one of an object or event that should have the attention of the user at a future time, and
    the operation configured to generate an indication of the at least one of object or event that should have the attention of the user at a future time.

13. The non-transitory computer-readable storage medium of claim 8, wherein the determining of whether or not the user is distracted includes:
    using a machine learned model trained to analyze features and their probabilities, the features being associated with the gaze direction and the surroundings,
    determining a probability that the user is distracted based on the features and their probabilities, and
    the user is determined to be distracted if the probability that the user is distracted is above a threshold.

14. A wearable device comprising at least one processor and at least one memory including computer program code, the at least one memory and the computer program code configured to, with the at least one processor, cause the wearable device to:
    determine a gaze direction of a user of the wearable device;
    capture an image using a forward-looking camera of the wearable device;
    detect a surroundings of the user based on the image;
    determine whether or not the user is distracted based on the gaze direction and the surroundings; and
    in response to determining the user is distracted, cause an operation to be performed on the wearable device, the operation configured to cause the user to change to change an attention of the user.

15. The wearable device of claim 14, wherein
    the image includes at least one of an object or an event,
    the surroundings of the user is based on the at least one of object or event, and
    the user is distracted if the gaze direction is away from the at least one of object or event.

16. The wearable device of claim 14, wherein
    the wearable device includes a speaker, and
    the wearable device generates an audible signal on the speaker to change the attention of the user.

17. The wearable device of claim 14, wherein
    the wearable device includes an overlay display, and
    the wearable device generates an indicator on the overlay display to change the attention of the user.

18. The wearable device of claim 14, wherein the computer program code is further configured to cause the wearable device to:

reading surroundings information from a datastore, the surroundings information indicating at least one of an object or event that should have the attention of the user at a future time, and the operation configured to generate an indication of the at least one of object or event that should have the attention of the user at a future time.

19. The wearable device of claim 14, wherein the determining of whether or not the user is distracted includes:

using a machine learned model trained to analyze features and their probabilities, the features being associated with the gaze direction and the surroundings, determining a probability that the user is distracted based on the features and their probabilities, and the user is determined to be distracted if the probability that the user is distracted is above a threshold.

20. The wearable device of claim 14, wherein the wearable device is one of a smart glasses, a head mounted display, an augmented reality device, a virtual reality device, a mixed reality device, or a wearable computing device.

* * * * *